United States Patent Office 2,852,497
Patented Sept. 16, 1958

2,852,497

UNSATURATED SULFONAMIDES OF CHLOROSULFONATED OLEFIN POLYMERS

Grant Thompson, Wilmington, Del., assignor to E. I. du Pont de Nemours and Company, Wilmington, Del., a corporation of Delaware No Drawing. Application July 24, 1956
Serial No. 599,687

13 Claims. (Cl. 260—79.3)

This invention relates to curable elastomers and more particularly to novel derivatives of chlorosulfonated polyolefins curable by sulfur.

In the search for new elastomers, chlorosulfonated polyethylenes have been developed, which are curable by means of certain divalent metal oxides, notably litharge, as described in U. S. Patent 2,416,061, to give products of adequate to good physical properties and exceptionally good stability and chemical resistance, including resistance to the effects caused by ozone and by outdoor exposure. The physical properties of the cured chlorosulfonated polyethylene in which improvement is desirable, are resilience and resistance to deformation (compression set).

Moreover, the special metal oxide method for curing these elastomers is not entirely satisfactory. Large proportions of the metal oxides are required for good cures and litharge must be used if the cured product is to have good water resistance. Litharge is somewhat costly, must be handled with care because of toxicity, and gives the cures an undesirable yellow color. Recently, it has been found that certain copolymers of ethylene with higher olefins may also be chlorosulfonated to give elastomers. Although these are substantially superior in some properties, they still are in need of improvement in such properties as resilience and compression set.

It has now been found that elastomers having the desirable characteristics of chlorosulfonated polyethylene but capable of being cured with sulfur to give vulcanizates of improved resilience and related properties may be made by treating the chlorosulfonated products with the appropriate unsaturated amines.

It is an object of the present invention to prepare elastomers capable of being cured with sulfur to give vulcanizates of improved resilience and related properties by treating chlorosulfonated polymers with unsaturated amines.

More specifically, this invention is directed to unsaturated sulfonamides of chlorosulfonated polyolefins curable by sulfur.

This invention relates to a sulfur curable chlorinated saturated polymer of a terminally unsaturated olefin, substituted by the grouping —$SO_2NR_1R_2$ in which $R_1$ is hydrogen or alkyl and $R_2$ is an alkenyl group of from 3 to 8 carbon atoms in which the double bonds are separated from the nitrogen by at least one —$CH_2$— group, and the total number of carbon atoms in both $R_1$ and $R_2$ is not more than 22, the original hydrocarbon polymers being normally solid and having a molecular weight greater than 10,000, the nitrogen content being within the range of 0.2 to 1.5% by weight of said product.

The chlorosulfonated polymers used as starting materials may be made by the process of U. S. Patent 2,586,363 of McAlevy, which process relates mainly to polyethylene.

Other chlorosulfonated polymers which are particularly useful as starting materials are made by copolymerizing at least two monoolefins, each monoolefin being terminally unsaturated, and containing not more than 6 carbon atoms, each monoolefin preferably being present as a component in the copolymer to an extent not greater than 60 mol percent and said copolymers containing from 5% to about 35% of chlorine and 0.5% to 3.0% of sulfur; a catalyst is normally used and is preferably one containing titanium with a valence of less than 4. Such catalysts, which may also be used for the polymerization of ethylene, are conveniently made by a reaction of a lithium aluminum alkyl with titanium tetrachloride in a hydrocarbon solvent which may also serve in the carrying out of polymerization, although catalysts made, for example, by the reaction of Grignard reagents or certain finely divided metals with titanium tetrachloride or catalysts made from compounds of transition groups IV to VI of the periodic table in place of titanium tetrachloride may also be used. The polymerization may take place at ordinary temperatures and pressures; it is usually convenient to allow the temperature to rise spontaneously from 50–60° C. and the rate of reaction may be increased by increasing the concentration of the monomer, by pressure or increasing the temperature, or both. The monomers are usually added simultaneously to the catalyst solution over a period of several hours and in the ratio in which they are desired in the copolymer.

The chlorosulfonation of the olefinic polymers is conveniently carried out in an inert solvent such as carbon tetrachloride, by first adding chlorine and then a mixture of chlorine and sulfur dioxide. A reaction initiator may be used as is more particularly described in U. S. Patent 2,503,252 and U. S. Patent 2,503,253. The chlorosulfonated products may be isolated by removing the carbon tetrachloride or other solvent in which they are made, by steam distillation or by evaporation on a drum drier in which the dried film can be removed from the drum as a self-supporting, continuous film suitable for further processing. Suitable stabilizers for the product are epoxy compounds such as the condensation products of epichlorohydrin with diphenols.

The olefins used to make the polymers referred to above may be ethylene, propylene, butene-1, hexene-1, etc., alone or together. Representative copolymers are the ethylene propylene copolymers, ethylene butene-1 copolymers, propylene butene-1 copolymers, ethylene hexene-1 copolymers, and copolymers of ethylene propylene and butene-1. Preferably, ethylene will be an important component, that is, it will be present in the polymeric material to the extent of 40 to 100%. Preferably, the higher olefins will not contain more than six carbon atoms. The polymer or copolymer will have a molecular weight of at least 10,000 and the upper limit be determined only by the requirement that the viscosity of dilute solutions in organic solvents of the polymer and its chlorosulfonated product should not be so great that chlorosulfonation and other reactions cannot be advantageously carried out therein.

The sulfur content of the chlorosulfonated product, from which the unsaturated amides of the present invention are made, will, in general, be between about 0.5 and about 4%. The total chlorine content will, in general, be between 5 and 40%, the higher proportions, 25 to 40% being best for polyethylene, and the lower proportions, 5 to 35% being best where propylene and higher olefins are present.

The amines used to make the unsaturated sulfonamide groups of the above definition are represented by $NHR_1R_2$, where $R_1$ is hydrogen or alkyl and $R_2$ is an alkenyl group of from 3 to 8 carbon atoms or pentadienyl in which the double bonds are separated from the nitrogen by at least one —$CH_2$— group and the total number of carbon atoms in both $R_1$ and $R_2$ is not more than 22. Thus they are either primary or secondary, the secondary amine being preferred. Examples of the unsaturated groups ($R_2$) which may be used are allyl, methallyl, butenyl, pentenyl and octenyl. $R_1$ may be hydrogen or an alkyl radical of from 1 to 18 carbon atoms such as butyl, octyl, cetyl, or octadecyl, but is preferably methyl or ethyl. $R_1$ and $R_2$ are chosen so that together they contain not more than 22 carbon atoms.

The reaction between the amine and the —$SO_2Cl$ groups of the chlorosulfonated polyolefin is preferably carried out in an inert solvent, such as an aromatic hydrocarbon, using an excess of the amine. The reaction takes place at ordinary temperatures and may be assisted by raising the temperature, up to 100° C. or higher. The number of sulfonamide groups and hence the nitrogen content of the products may thus be regulated by choosing a chlorosulfonated polyolefin of the proper sulfur content, assuming that substantially all of the sulfur is in the form of —$SO_2Cl$ group and that substantially all of these react to form —$SO_2NR_1R_2$. Increasing the number of —$SO_2NR_1R_2$ groups (as shown by the nitrogen content) increases the number of reactive unsaturated groups to be cross-linked by the action of the sulfur, applying the currently held theory of vulcanization. Irrespective of theory, however, the ability to vulcanize increases with the nitrogen content. Elastomers with 0.2 to 1.5% nitrogen are suitable for curing. Below this range the elastomers are hard to cure, while above this range they cure so rapidly that scorching becomes a factor. The preferred range is 0.4 to 0.8%.

The vulcanization of the unsaturated substituted sulfonamides of the present invention may be carried out like the vulcanization of natural rubber, usually using sulfur and preferably a vulcanization accelerator and a small amount of zinc or magnesium oxide. Various modifications of sulfur curing are particularly described in Encyclopedia of Chemical Technology, Kirk and Orthmer, Interscience Encyclopedia, Inc., New York, 1953, vol. II, pages 892–927. These modifications are applicable here. The present elastomers may of course be cured in a typcial gum stock, such as is used in the examples for the purpose of comparison, or in reinforced or highly loaded stocks, containing carbon black, finely divided silica, esterified silica, clay, magnesium and calcium carbonates, and the like. The known pigments and coloring agents may also be used.

Example 1

A solution of 40 g. of chlorosulfonated polyethylene containing 27.14% chlorine and 1.45% sulfur in 400 cc. of toluene is distilled until no more water separates from distillate. The solution is then heated at 60° C. and 17.0 g. of N-ethyl allylamine is added. The reaction mixture is agitated at 60° C. overnight. The product is isolated by pouring into 400 cc. methanol. The sticky polymer is transferred to a waring blendor, a vessel agitated with high speed sharpened blades, with 200 cc. of methanol and chopped up to small pieces. The polymer is filtered and the process of agitating for five minutes in the blendor is repeated twice with methanol and twice with water. The product is washed on the filter with methanol, sucked dry and air-dried overnight to give 39 g. of polymer which has excellent behavior on a rubber mill. The product contains 0.51% nitrogen.

(a) The product (100 parts) is compounded with 5 parts magnesium oxide, 1 part mercaptobenzothiazole, 2 parts benzothiazyl disulfide and 2 parts sulfur and press-cured at 154° C. for 60 minutes to give the following properties:

| | |
|---|---|
| $M_{300}$ | 2050 |
| $T_B$ | 2750 |
| $E_B$ | 330 |
| Compression set (22 hrs. at 70° C.) percent | 9 |
| Shore hardness | 75 |
| Yerzley resilience percent | 79 |

(b) An analogous product prepared with piperidine to contain 0.5% nitrogen is cured in the same manner to give vulcanizates with the following properties:

| | |
|---|---|
| $M_{300}$ | 430 |
| $T_B$ | 1000 |
| $E_B$ | 600 |
| Compression set percent | 99 |
| Shore hardness | 60 |
| Yerzley resilience percent | 64 |

This demonstrates that an unsaturated amine, as in (a), is required to give low compression set, high resilience, and good tensile properties.

(c) The chlorosulfonated polyethylene used in making the amine products in the above experiments, when cured itself, using the same compounding formula, gives a product with the following properties:

| | |
|---|---|
| $M_{300}$ | 300 |
| $T_B$ | 400 |
| $E_B$ | 280 |
| Compression set percent | 100 |
| Shore hardness | 50 |
| Yerzley resilience percent | 52 |

This shows that the chlorosulfonated polyethylene itself is not cured to a significant extent by sulfur.

(d) When 100 parts of this chlorosulfonated polyethylene is compounded with 40 parts of litharge, 2.5 parts of hydrogenated rosin acid, 0.75 part of dipentamethylene thiuram tetrasulfide and 0.75 part of benzothiazyl disulfide and press-cured for 30 minutes at 153° C., a vulcanizate with the following properties is obtained:

| | |
|---|---|
| $M_{300}$ | 2200 |
| $T_B$ | 2250 |
| $E_B$ | 305 |
| Compression set percent | 57 |
| Shore hardness | 66 |
| Yerzley resilience percent | 70 |

This shows that the original chlorosulfonated polyethylene, even when cured in the formula especially designed for it, is deficient in resilience and particularly as regards to compression set.

Example 2

Chlorosulfonated polyethylene (30 g.) containing 27.45% chlorine and 1.57% sulfur but otherwise similar to that used in Example 1 is dissolved in 300 cc. of dry toluene by agitating at room temperature for 2 hours. To this is added 1.6 cc. of allyl amine and the reaction mixture is stirred 4 hours at room temperature. The product is isolated by adding slowly with vigorous agitation 300 cc. of acetone, then 150 cc. of 2 to 1 acetone-methanol and finally 300 cc. of methanol. The fluocculent precipitate is filtered, washed with methanol and then air-dried. The product (28 g.) can be handled conveniently on a rubber mill. It gives a vulcanizate similar to that of Example 1.

Example 3

A solution of 40 g. of chlorosulfonated ethylenepropylene copolymer containing the olefins in the ratio of 1:1 and containing 18% chlorine and 1.6% sulfur in 1000 cc. of toluene is distilled until no water can be detected in the distillate. The solution is cooled to 60° C., 25.7 g. of N-ethyl allylamine is added, and the reaction mixture agitated at 60° C. overnight. The polymer was isolated by drowning in methanol and drying the polymer at 80° C. on a rubber mill. The product weighs 35 g. and contains 0.52% nitrogen.

The polymer (100 parts) is compounded with 5 parts of magnesium oxide, 2 parts of benzothiazyl disulfide, 1 part of mercapto benzothiazole and 2 parts of sulfur and press-cured at 153° C. for 60 minutes to give the following properties:

```
M_300 ----------------------------------------- 1880
T_B ------------------------------------------- 3150
E_B -------------------------------------------- 400
Compression set---------------------percent---   42
Shore hardness --------------------------------  65
Yerzley resilience-------------------percent---  78
```

Many widely difference embodiments of this invention may be made without departing from the spirit and scope thereof; it is to be understood that this invention is not limited to the specific embodiments thereof except as defined in the appended claims.

I claim:

1. A sulfur curable chlorinated saturated polymer of at least one terminally unsaturated olefin substituted by the grouping —$SO_2NR_1R_2$ in which $R_1$ is taken from the group consisting of hydrogen and an alkyl radical of from 1 to 18 carbon atoms, $R_2$ is an alkenyl radical having from 3 to 8 carbon atoms, $R_1$ and $R_2$ having a total of not more than 22 carbon atoms, the double bonds being separated from nitrogen by at least one —$CH_2$— group, the original hydrocarbon polymers being normally solid polyolefins of a molecular weight greater than 10,000, the nitrogen content being within the range of 0.2 to 1.5% by weight of the substituted polymer.

2. The chlorosulfonated polyolefin of claim 1 wherein the sulfur content is within the range of 0.5 to about 4% by weight of said polymer.

3. The chlorosulfonated polyolefin of claim 1 wherein the chlorine content is within the range of 5 to 40% by weight of said polymer.

4. The process of preparing a sulfur curable chlorinated saturated polymer of at least one terminally unsaturated olefin, substituted by the grouping —$SO_2NR_1R_2$ in which $R_1$ is taken from the group consisting of hydrogen and an alkyl radical of from 1 to 18 carbon atoms, $R_2$ is an alkenyl radical having from 3 to 8 carbon atoms, $R_1$ and $R_2$ having a total of not more than 22 carbon atoms, the double bonds being separated from nitrogen by at least one —$CH_2$— group, which process comprises reacting a normally solid chlorosulfonated polyolefin of a molecular weight greater than 10,000 with an amine represented by the formula —$NHR_1R_2$, $R_1$ and $R_2$ being as above defined.

5. The process of claim 4 wherein the chlorosulfonated polyethylene is reacted with an excess of the defined amine in an inert solvent.

6. The process of claim 4 wherein the chlorosulfonated polyolefin derivative has a nitrogen content within the range of 0.2 to 1.5% by weight of said derivative.

7. The process of claim 4 wherein the chlorosulfonated polyolefin derivative has a nitrogen content within the range of 0.4 to 0.8% by weight of said derivative.

8. A sulfur-cured chlorinated saturated polymer of at least one terminally unsaturated olefin substituted by the grouping —$SO_2NR_1R_2$ in which $R_1$ is taken from the group consisting of hydrogen and an alkyl radical of from 1 to 18 carbon atoms, $R_2$ is an alkenyl radical having from 3 to 8 carbon atoms, $R_1$ and $R_2$ having a total of not more than 22 carbon atoms, the double bonds being separated from nitrogen by at least one —$CH_2$— group, the original hydrocarbon polymers being normally solid polyolefins of a molecular weight greater than 10,000, the nitrogen content being within the range of 0.2 to 1.5% by weight of the substituted polymer.

9. The chlorosulfonated polyolefin of claim 3 wherein $R_1$ is ethyl and $R_2$ is allyl.

10. The chlorosulfonated polyolefin of claim 3 wherein $R_1$ is hydrogen and $R_2$ is allyl.

11. The chlorosulfonated polyolefin of claim 3 wherein $R_1$ is butyl and $R_2$ is allyl.

12. The chlorosulfonated polyolefin of claim 3 wherein $R_1$ is methyl and $R_2$ is allyl.

13. The chlorosulfonated polyolefin of claim 3 wherein $R_1$ is ethyl and $R_2$ is methallyl.

References Cited in the file of this patent

UNITED STATES PATENTS

| Number | Name | Date |
|---|---|---|
| 2,416,069 | Scott | Feb. 18, 1947 |
| 2,615,000 | Bradley | Oct. 21, 1952 |
| 2,646,422 | Strain | July 21, 1953 |
| 2,723,257 | McAlevy | Nov. 8, 1955 |